United States Patent [19]

Janian

[11] Patent Number: 4,508,356
[45] Date of Patent: Apr. 2, 1985

[54] MODIFIED C-SHAPED MECHANICAL SPRING SEAL

[76] Inventor: Robert Janian, 3845 Ballina Canyon Rd., Encino, Calif. 91436

[21] Appl. No.: 617,621

[22] Filed: Jun. 6, 1984

[51] Int. Cl.³ .............................................. F16J 15/12
[52] U.S. Cl. .................................. 277/205; 277/164; 277/235 R; 267/1.5
[58] Field of Search ................. 277/164, 205, 206 R, 277/206 A, 227, 235 R, 184; 267/1.5

[56] References Cited

U.S. PATENT DOCUMENTS

| | | | |
|---|---|---|---|
| 3,680,874 | 8/1972 | Schwarz | 277/205 X |
| 4,133,542 | 1/1979 | Janian et al. | 277/164 X |

FOREIGN PATENT DOCUMENTS

| | | | |
|---|---|---|---|
| 1414478 | 9/1965 | France | 277/205 |
| 17957 | of 1896 | United Kingdom | 277/205 |
| 735801 | 8/1955 | United Kingdom | 277/205 |

*Primary Examiner*—Robert S. Ward, Jr.
*Attorney, Agent, or Firm*—Fraser and Bogucki

[57] ABSTRACT

A mechanical spring seal comprising in combination an elastomeric jacket and a resilient spring insert having modified and matching C-shaped cross-sectional configurations. The major portion of the length of the spring follows a relatively straight path between a curved base and a position along the cross section at which the spring is widest, forming a pair of opposed cantilever arms which provide the major sealing force. From this region of greatest width to the tips of the spring, the curvature is substantially sharper, enabling the end of the spring to fit in fixed locked position within the jacket which conforms to it. At the base of the C-shaped spring, the curvature is also sharper than it is in the long cantilever arm portions. The spring receiving interior concavity in the jacket is complementary in nature to the shape of the spring, and has an open side for insertion of the spring into the jacket, the inwardly angled tips of the spring preventing its release from the jacket although the spring can also be replaced by an O-ring.

16 Claims, 9 Drawing Figures

MODIFIED C-SHAPED MECHANICAL SPRING SEAL

BACKGROUND OF THE INVENTION

This invention relates to mechanical spring seals of the type in which a deformable seal element, typically of synthetic material, is spring loaded by an internal metal spring element, and is particularly directed to mechanical spring seals of the above type of simple cross-sectional shape and having good resiliency, and in which the spring element is readily inserted and locked into the seal element.

Spring seals in a wide range of sizes are increasingly being used for a range of critical applications as static and dynamic sealing elements. They are far superior to O-rings where pressure and temperature requirements are substantial, for example, because they provide long wear with low friction when interposed between opposing surfaces, while being resistant to the high temperature levels and pressures that may be encountered.

The spring seals are based upon the concept of using an outer cover or jacket of stable high temperature resistant resin, such as Nylon or Teflon, which jacket contacts the opposing surfaces to be sealed, while incorporating, in a cavity in the jacket, an elongated spring element, typically of metal. Although synthetic resin sealing materials are inert, slippery and withstand wear, they have little shape memory. The metal spring compensates for the lack of shape memory and resiliency of the jacket materials by urging the sides of the cover outwardly against the facing surfaces.

A number of different configurations of spring seals are known, as for example my prior U.S. Pat. No. 4,133,542, on a configuration of, and method for making, a spring seal. In this structure the spring has a base that is circular in form, for insertion into a mating concavity in the jacket. It is superior in a number of respects to prior U-shaped spring seal configurations, because the U-shaped elements have sharp corners creating stress points when the sides are compressed. Also, tips on the jacket are required to hold in the spring and these can be readily damaged or broken off to allow loss or partial displacement of the spring relative to the jacket, with consequent adverse effects on sealing properties. Similarly, where square type or rectangular type spring elements are employed, the sharp corners are unduly stressed since all the bending occurs at the corners, and such corners tend to snap or become fatigued.

A number of configurations are known in which the spring is circular in shape, but the circular spring shape provides very little resilience. In consequence, the product manufacturer who is to use the seal is required to manufacture a part in which separated but facing surfaces have very precise spacing tolerances, substantially increasing his costs. A concomitant factor is that, because of the limited resilience, static seals that fit a given spacing must be of different size than dynamic seals used for the same spacing.

The special shape of my above patent minimizes some of these problems, but on the other hand is a somewhat more complex configuration that requires a special jacket shape. Further, none of the spring seals previously known permits incorporation of an internal O-ring, which is sometimes desirable in practical applications, as a substitute for the metal spring. Also, many spring seals require a different configuration for a static application as opposed to a dynamic application.

It is accordingly desirable to provide a mechanical spring seal having a deformable seal element or jacket, and a cooperating spring element which fits within the jacket, wherein the cross sectional shapes of the mating surfaces of the jacket and spring element are non-complex. The spring element should be easily insertable within the jacket, while locking the spring in position within the jacket. In addition, it is also desirable that the spring element of such mechanical seal be free of sharp angles or turns to avoid stress and fatigue points. Still another aim of the invention is the provision of a seal element of the above type, which has good resilience, is highly durable, and which is effective for both static and dynamic applications.

SUMMARY OF THE INVENTION

In accordance with the present invention, a novel jacket and novel spring insert are used in combination that have excellent resiliency, are easily insertable, and permit the substitution of an O-ring in the jacket for the metal spring. The spring and the interior cavity of the jacket are configured in a generally C-shaped or crescent cross-sectional configuration, but incorporate specific curvature relationships between the base and the tips of the shape.

With respect to the spring, for example, a major portion of the length of the spring follows a relatively shallow curvature or straight line between the curved base and a region along the cross section at which the spring is widest, forming a pair of joined but opposed cantilever arms which provide the major sealing force. The spring curves from this region of greatest width to the spaced apart tips of the spring, enabling the end of the spring to fit in fixed locked position within the jacket which conforms to it. At the base of the C-shaped spring, the curvature is also sharper than it is in the long cantilever arm portions. In one example, the spring has two different curvatures, at the base and tip regions, joined by straight line tangential segments in the cantilever arm region.

The spring receiving interior concavity in the jacket is complementary in nature to the shape of the spring, and has an open side. In consequence the spring is readily inserted into the jacket through its open side, although the inwardly angled tips of the spring prevent its release even if the edge of the jacket might be damaged. Furthermore, the spring serves as a resilient seal throughout compression until the spring tips come together. This enables one spring seal of a given width to be used within a gap of substantially different dimensions, freeing spring seal users from the requirement for high precision in their own products.

In addition, the spring can be extracted and an O-ring can be inserted within the modified C-shaped cavity of the jacket to provide a sealing effect where pressure and temperature requirements permit. Further, the spring seal of the invention is equally effective for both static and dynamic applications.

The spring element is an elongated member of substantially constant outline or cross section in the modified C-shape as described above, and having a sinuous longitudinal configuration defined by interdigitated notches extending inwardly from opposite sides of the spring, so that the elongated spring also strip has resilience along its length.

BRIEF DESCRIPTION OF THE INVENTION

Having thus described the invention in general terms, reference will now be made to the description below taken in conjunction with the accompanying drawings wherein:

DETAILED DESCRIPTION OF THE INVENTION

Figure 1:
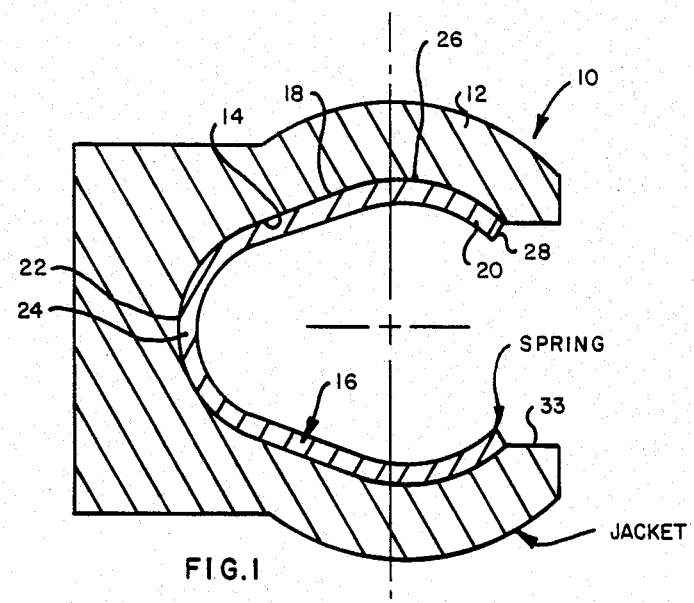
FIG. 1 is a cross sectional view of a mechanical spring seal according to the invention comprising an outer jacket containing a spring element of C-shaped configuration in a cavity within the jacket.

FIG. 1 shows an advantageous form of mechanical seal 10 according to the invention consisting of the combination of a jacket or cover 12 formed of an elastomeric sealing material, such as Nylon or Teflon, having a modified C-shaped internal cross section or outline within an interior cavity 14, and a metallic spring 16 of modified C-shaped outer cross sectional configuration conforming to and seated within the cavity 14 of the jacket.

Figure 2:
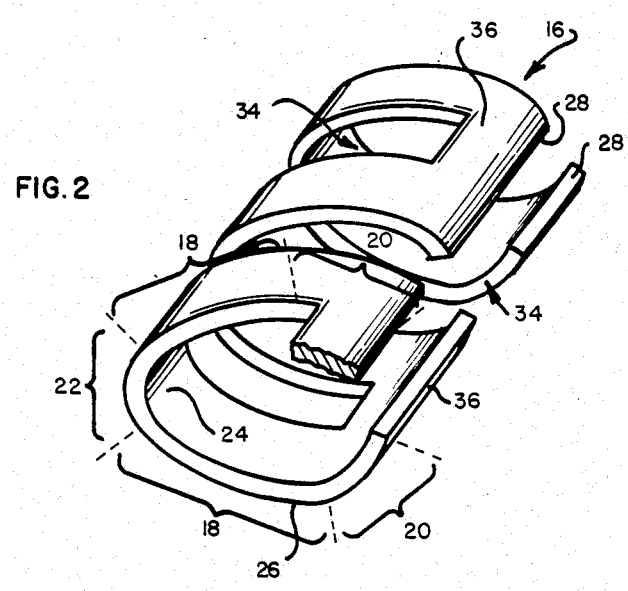
FIG. 2 is a perspective view of the spring element of FIG. 1.

As best seen in FIG. 2, the spring element 16 in its preferred form is continuous but has three different curvatures or arc segments, at 18, 20 and 22. The opposite portions of the spring between the base 24 and the region of greatest width of the spring at 26 on each side of the spring are principally straight segments or segments having a relatively large radius of curvature. In effect these segments 18 form cantilever arms to bias the jacket 12 outwardly by the resilient action of the arms against the jacket.

Second curved arc segments are formed on opposite sides of the spring by terminal portions 20 extending from the region of greatest width of the spring on opposite sides thereof, at 26, to the tips 28 of the spring. These surfaces have a smaller radius of curvature than the cantilever arm portions, but a larger radius than the base 22 segment of the spring 16. This enables the spring to be well locked in the jacket by contact of the outer tip portions 20 of the spring with the inner surfaces defined by the concavity 14 of the jacket 12, adjacent to the open side of the jacket. In this respect it is noted that the tips 28 of the spring terminate short of the tips 33 of the jacket 12, adjacent the open side thereof. The third surface of curvature 22 serves to connect the cantilever arm segments 18 together, forming the base 24.

In order to provide sealing along an elongated junction, an elongated spring strip 16 as shown in FIG. 2 is provided having a sinuous longitudinal configuration with a plurality of spaced notches or slots 34 cut into the spring from opposite sides. The slots 34 accordingly protrude alternately from opposite sides of the spring to longitudinal connector segments 36 which hold the adjacent cantilever arm 18 together while permitting flexure of the spring.

Figure 3:
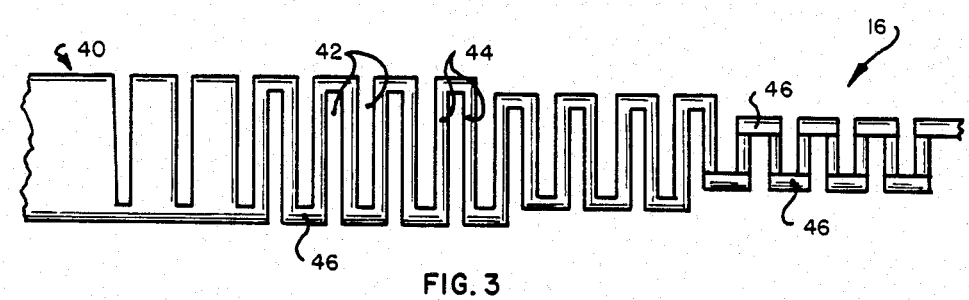
FIG. 3 shows a spring strip used to form a spring of a type shown in FIG. 2.

Referring to FIG. 3, showing the manner in which a spring 16 is sequentially formed, a flat strip, indicated at 40, is first punched with lateral slots 42 to form a plurality of lateral arms 44 alternately connected through end members 46. The spring is then shaped employing successive dies to arrive at the final longitudinal configuration of the spring having the above described modified C-shaped or crescent cross section illustrated in FIG. 2. The resulting spring element 16 has a compliance along its length, as well as being compressible at the cantilever arm segments 18.

Figure 4:
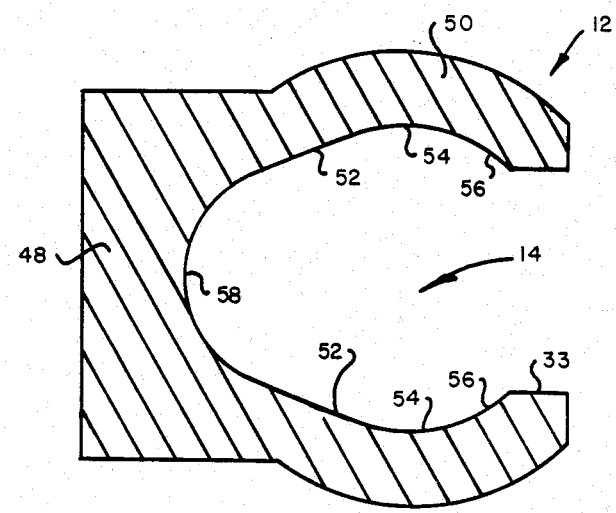
FIG. 4 is a cross sectional view of the jacket of the mechanical spring seal of FIG. 1.

As best shown in FIG. 4, the jacket 12, formed of a synthetic resin material such as Teflon, has a base 48 and curved side arms 50 defining a modified C-shaped interior cavity 14. The side arms 50 of the jacket extend from the base 48 to define inner surfaces 52 that are straight, or have a long radius of curvature, substantially conforming to the outer surface of the cantilever arms 18 of the spring when seated within the jacket 12. The first radius of curvature of the arms 50 extends to side regions 54 at which the jacket has a maximum selected width. Curved tip portions 56 extending from the region of maximum width of the jacket have a given radius of curvature such that they converge toward the tips 33. The base curve segment 58 connecting the arms 50 to the jacket base 48 has a smaller radius of curvature than the radius of curvature of the arms at 56.

The metallic spring 16 of C-shaped cross-sectional configuration thus conforms to the interior configuration of the modified C-shaped cavity 14 in the jacket, and is registrable with the cavity for seating therein.

Figure 5A:
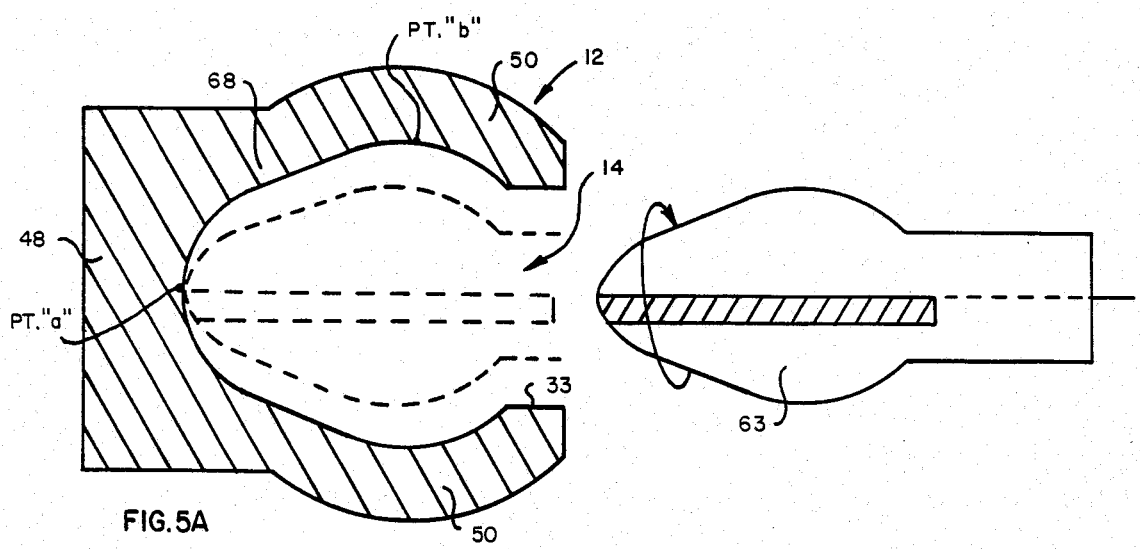
FIG. 5A illustrates elements used in a process for forming the cavity in the jacket of FIG. 4, utilizing an initial cutting tool.
Figure 5:
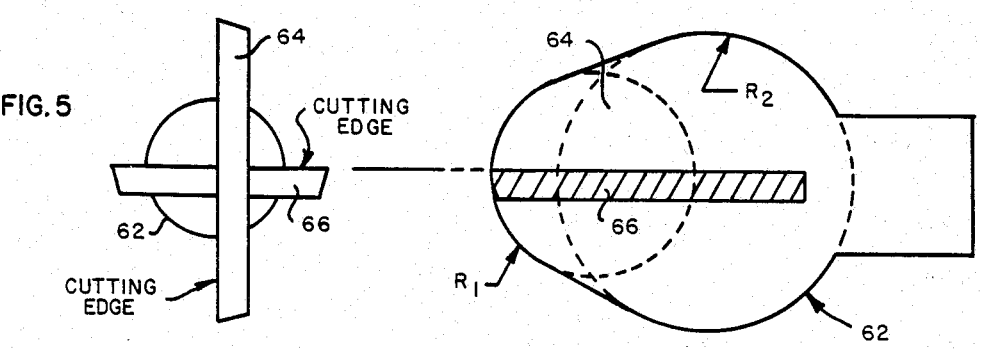
FIG. 5 shows a final cutting tool for forming the cavity in the jacket of FIG. 4.

As shown in FIG. 5, the jacket 12 may be formed by a final rotating forming tool 62 having cutting knives 64 and 66 thereon which extend at selected radial distances from the center of rotation of the tool 62. The tool 62 is moved along the length of the jacket 12, cutting a shape corresponding to the internal C-shaped cavity 14 to be formed in the jacket. As illustrated in FIG. 5A which illustrates an initial cutting tool 63 of smaller outline, the tool 63 cuts along an initially solid body of Teflon at 68 having an outer shape defined by dotted lines within the final concavity defined by solid lines in the jacket. As a cutting tool cuts along the jacket material, the cutting edges of the knives 64, 66 remove material to leave the shaped but unstressed sidearms of the jacket 12.

A convenient and advantageous spring and seal design is based upon an outline defined in part by arc segments of a pair of circles having spaced apart centers and different radii of curvature. Thus, in FIG. 5, the cutting member 64 has an outline with a terminal radius $R_1$ at the closed end, and a maximum radius $R_2$ from the beam or broadest width section of the jacket 12 to the open tips. The $R_1$ and $R_2$ curvatures are interconnected by lines tangent to both circumferences, and thus form a substantial part of the cantilever length for the spring. This means that the radius of curvature of the cantilever length is substantially infinity for a principal part of the two cantilever arms. (The inner surface of the jacket 12 corresponds to the outer periphery of the inserted spring member not shown in FIGS. 5 and 5A). It is convenient to place the center of the $R_2$ circle on the circumference of the $R_1$ circle, so that the total cantilever length (spring base to maximum width of the spring) is $2R_1$. The $R_1$ radius is advantageously selected to be approximately 30% of the depth of the jacket 12 from the base 48 to the point of maximum width. The spacing between the tips is chosen to be equal to $2R_1$, which enables easy insertion of the spring element.

With this geometry, the shape of the spring and jacket can be precisely defined and appropriate tooling can be fabricated for any recess into which a seal structure in accordance with the invention is to be seated.

Figure 6:
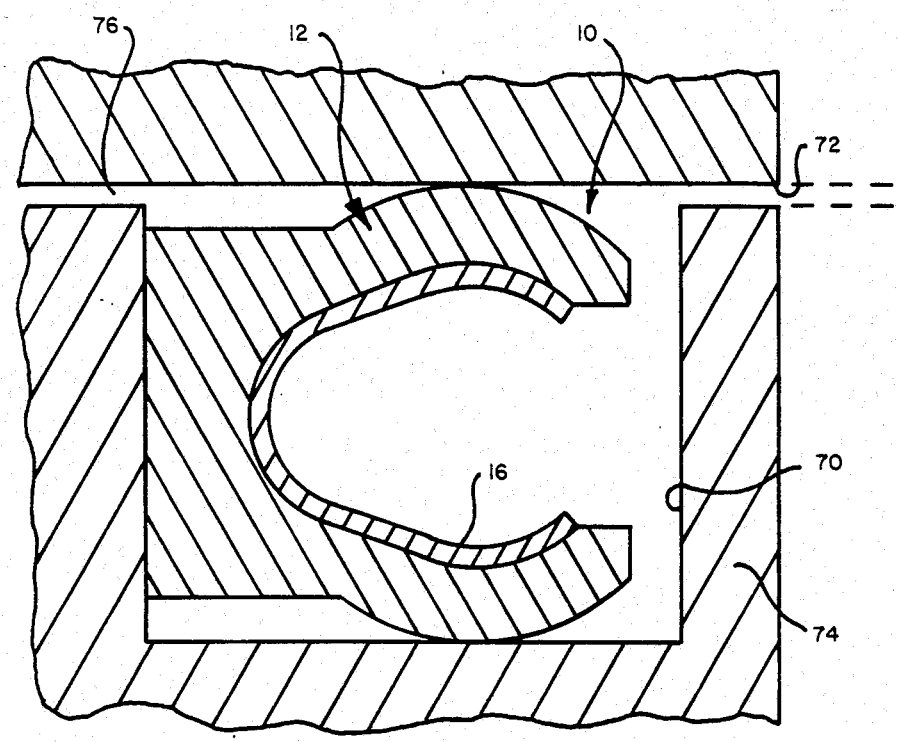
FIG. 6 is a sectional view of the mechanical spring seal of FIG. 1 in sealing engagement between two opposing surfaces.

Referring now to FIG. 6, according to one embodiment, the mechanical spring seal 10 of the invention, comprising the jacket 12 and modified C-shaped spring 16 seated therein, can be inserted in a groove 70 functioning as a gland between two opposing surfaces 72 and 74. The groove 70 receives the mechanical spring seal 10, which prevents passage of fluid through the passage 76, thus providing a sealed joint wherein the jacket 12 functions as the seal, with its resilient memory provided by the spring 16.

Figure 7:
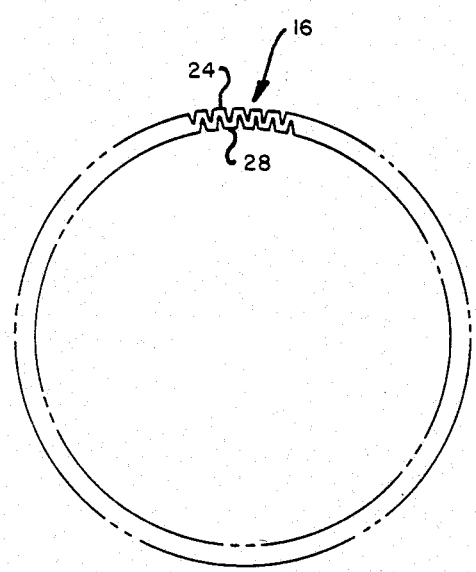
FIG. 7 shows the spring of FIG. 2 in circular outline form.

When the mechanical spring seal of the invention is in elongated form, as shown in FIG. 3, the length of spring 16 can be curved about the base portion 24 so that the spring is in circular form, as shown in FIG. 7, with the tips 28 of the cantilever arms 18 facing radially inwardly for inside diameter sealing, the jacket in which such spring is inserted also being of circular shape. Alternatively, the circular spring can be formed with the tips of the cantilever arms facing radially outwardly for outside diameter sealing, or the spring can be in circular form with the tips of the cantilever arms facing out of the paper for lateral diameter sealing.

Figure 8:
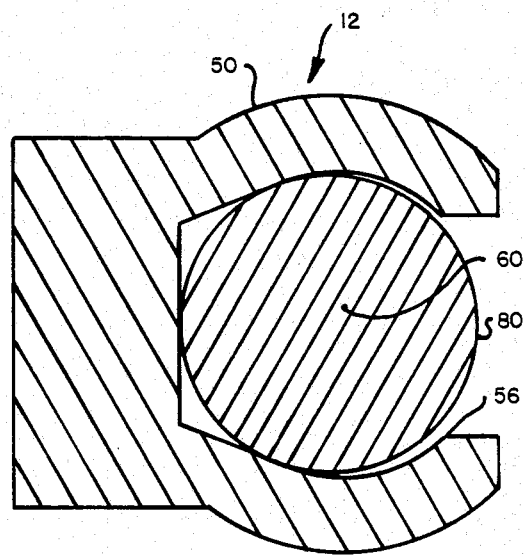
FIG. 8 shows an alternative form employing an O-ring in the jacket instead of the spring element of FIG. 1.

According to a still further modification of the invention, instead of inserting a spring having a modified C-shaped cross-section as described above, within the jacket 12, as seen in FIG. 8, the spring can be replaced by an O-ring 80. The O-ring 80 is inserted and seated within the cavity 14 of the jacket 12 of modified C-shaped cross-section. The O-ring 80 is prevented from being displaced from within the jacket cavity by the outwardly curved opposed tip portions 56 of the jacket arms 50. The O-ring 80 functions as a spring and expander to provide the required spring force in the outward direction against the jacket arms 50. Such O-rings can be rubber, elastomeric or other conventional materials.

The mechanical seal spring of the invention can be employed for both static and dynamic applications. Thus, the mechanical spring seal of the invention can be employed, for example, as shaft seals, piston seals, and flange seals, and for both low and high pressure applications.

From the foregoing, it is apparent that the mechanical spring seal of the invention comprises a combination of spring element and cover or jacket, wherein the spring element and the cooperating jacket are of readily fabricated, modified C-shaped, cross-sectional configurations. The jacket and the spring are designed so that when the spring element is inserted into the jacket the forward ends or tips of the cantilever arms are substantially coextensive with the outer tips of the jacket arms, thus locking the spring within the cavity of the jacket and preventing any relative motion between the spring element and the jacket. A smooth loading surface is maintained by the outward spring action of the cantilever arms of the spring against the arms of the jacket. The jacket can be machined to fit snugly into cooperative mating relationship with the entire outside surface of the spring, thus further preventing displacement between the spring and the inner surface of the jacket. In addition, if the edge of the jacket, at the tips thereof, become damaged as by wear, the inwardly angled tips of the spring will prevent release or displacement of the spring from within the jacket.

The mechanical spring seals of the invention can be made in varying sizes. A feature of the invention device is that since the spring serves as a resilient seal throughout compression of the spring, a spring of a given width can be employed within jacket cavities of a range of different dimensions. This avoids the necessity for high precision in the manufacture of the springs.

Various types of jacket materials can be employed, including in addition to Nylon and Teflon, Kel-F (polymers of chlorotrifluoroethylene), FEP (fluorinated ethylene propylene resin), Kynar (polyvinylidene fluoride), polyimides and filled fluorocarbon materials. Other materials can also be employed. The durability of the jacket is enhanced by the constant pressure being exerted on the sealing surfaces by the spring element, even though the elastomers may become hardened and embrittled as a result of operation.

Since various changes and modifications of the invention will occur to and can be made readily by those skilled in the art without departing from the invention concept, the invention is not to be taken as limited except by the scope of the appended claims.

What is claimed is:

1. A resilient spring element for insertion in a jacket having a generally C-shaped cavity comprising:
   an elongated member of substantially constant cross section having a sinuous longitudinal configuration, wherein the cross section of the member comprises a modified C-shaped outline having at least two different curvatures, the member including cantilever arm portions of relatively large radius of curvature between the base thereof and a region of greatest width of the member, and terminal portions from the region of greatest width on each side to the tips being of smaller radius of curvature than the cantilever arm portions.

2. The spring element as set forth in claim 1, wherein the cross section of the modified C-shaped member further comprises a base segment of a third radius of curvature smaller than the cantilever arm portions.

3. The spring element as set forth in claim 2 above, wherein the base segment has a radius of curvature $R_1$ and the terminal portion has a radius of curvature $R_2$ greater than $R_1$, the cantilever arm portion including straight sides tangential to the base segment and terminal portion curvatures.

4. The spring element as set forth in claim 2, wherein the elongated member is of metal, and the sinuous longitudinal configuration is defined by notches interdigitated from opposite sides.

5. A spring element for insertion in a jacket to form a mechanical seal, said spring element having a modified C-shaped cross section and formed of a pair of oppositely disposed cantilever arms and a curved base portion connected thereto, said cantilever arms terminating in a pair of inwardly curved tip portions, the cantilever arms of said spring element having a first relatively large radius of curvature extending from said base portion to the widest point of said spring element on opposite sides thereof, said spring element including a second radius of curvature smaller than said first radius of curvature and defined by said curved tip portions, and a third radius of curvature smaller than said first radius of curvature, and defined by said base portion.

6. The spring element as defined in claim 5, said third radius of curvature defined by said base portion being smaller than said second radius of curvature defined by said tip portions.

7. The spring element as defined in claim 6, wherein said spring element is an elongated member of substantially constant cross section having a sinuous longitudinal configuration and defined by spaced parallel notches extending from opposite sides of said spring element, forming arm members, with adjacent arm members being interconnected at one end thereof, and wherein the cantilever arms are relatively straight sided segments between the base portion and tip portions.

8. A spring seal comprising:
a jacket having a base and curved side arms defining a modified C-shaped interior cross section, the side arms of the jacket extending from the base along an arc having a first large radius of curvature to a point at which the jacket has a maximum selected width, the arms including tip portions from the region of maximum width having a smaller radius of curvature, and a metallic spring strip having a modified C-shaped cross sectional configuration conforming to and registrable within the cavity in the jacket.

9. The spring seal as set forth in claim 8, wherein the metallic spring strip includes a base portion of relatively small radius of curvature, a pair of cantilever arm sections of relatively large radii of curvature extending outwardly from the base portion to the region of greatest width of the spring strip, and a pair of terminal portions each extending inwardly from a different one of the cantilever arm sections with a relatively smaller radius of curvature than said cantilever arm sections.

10. The spring seal as set forth in claim 9, wherein the spring strip includes means defining interdigitated notches extending inwardly from opposite sides thereof such that the spring strip has resilience along its length.

11. A spring seal comprising in combination a spring element and a jacket of an elastomeric material receiving said spring element to form a mechanical seal, said jacket having a base and curved side arms defining a modified C-shaped interior cavity, the side arms of the jacket extending from the base along an arc having a first large radius of curvature to a point at which the jacket has a maximum selected width, the arms including converging curved tip portions from the region of maximum width having a smaller radius of curvature than the side arms; said spring element having a modified C-shaped cross section and formed of a pair of oppositely disposed cantilever arms connected to and extending from a curved base portion, said cantilever arms terminating in a pair of inwardly curved tip portions and conforming in curvatures to the interior cavity of the jacket and wherein said spring element is an elongated metal member of substantially constant cross section having a sinuous longitudinal configuration and defined by spaced parallel notches extending from opposite sides of said spring element, forming arm members, with adjacent arm members being interconnected at one end thereof.

12. The spring seal as set forth in claim 11 above, wherein the radius of curvature of the base is approximately half the length of the cantilever arm portions and wherein the tips of the terminal portions of the spring element are spaced apart by approximately twice the radius of curvature of the base.

13. The spring seal as defined in claim 11, said jacket being of a low resilience synthetic resin material having relatively small shape memory capability and having a base portion integral with the side arms for seating in a recess to be sealed.

14. A seal jacket receiving an internal spring element or O-ring comprising:
a base portion and extending side arms having spaced apart ends defining a modified C-shaped cross-section and being of a low friction, low resilience material having relatively small shape memory capability, the base portion and side arms defining an open-sided interior cavity having at least two different radii of curvature along the length of each side arm, a first curvature at the base portion being smaller than a second curvature at the ends.

15. The seal jacket as defined in claim 14, said side arms extending tangentially from the base portion along a substantially straight path to a region at which the jacket has a maximum selected width, and wherein the spacing between the ends of the arms is approximately twice the radius of curvature of the base portion such that a metal spring element or an O-ring may be inserted between the arms.

16. A spring seal comprising in combination a jacket having a base and curved side arms defining a generally C-shaped interior cross section, the side arms of the jacket extending from the base along an arc having a first large radius of curvature to a point at which the jacket has a maximum selected width, the arms including tip portions from the region of maximum width having a smaller radius of curvature; and an O-ring seated within the cavity in the jacket.

* * * * *